United States Patent [19]

Tominaga

[11] Patent Number: 4,920,922
[45] Date of Patent: May 1, 1990

[54] AQUARIUM LID

[75] Inventor: Kazutoshi Tominaga, Higashi Osakashi, Japan

[73] Assignee: Kabushiki Kaisha Tominaga Jyushi Kogyosho, Higashi Osakashi, Japan

[21] Appl. No.: 305,366

[22] Filed: Feb. 1, 1989

[51] Int. Cl.⁵ .............................................. A01K 64/00
[52] U.S. Cl. .................................................... 119/5
[58] Field of Search ............................................ 119/5

[56] References Cited

U.S. PATENT DOCUMENTS

| | | | |
|---|---|---|---|
| 3,125,065 | 3/1964 | Willinger | 119/5 |
| 3,225,736 | 11/1965 | Willinger et al. | 119/5 |
| 3,515,097 | 6/1970 | Sherman | 119/5 |
| 3,857,366 | 12/1974 | Willinger | 119/5 |

Primary Examiner—George E. Lowrance
Attorney, Agent, or Firm—Collard, Roe & Galgano

[57] ABSTRACT

An aquarium lid has a clear plastic body, and a front wall having a feeder port closed by a pivotal cover connected to the wall, wherein the front wall has a longitudinal edge protruding toward the rear section of the lid so as to hide any items placed in the rear section of the lid.

1 Claim, 5 Drawing Sheets

AQUARIUM LID

BACKGROUND OF THE INVENTION

The present invention relates to an aquarium lid, and more particularly to a lid for covering an aquarium for keeping pet fish such as tropical fish and gold fish.

The known aquarium lids for such use are formed of unclear tinted plastic, and includes a feeder port and an opening for permitting easy insertion or removal of a filter, a heater and other items. In addition, a light is provided on the inside of the lid toward the interior of the aquarium. The light equipment should be shielded from water or moisture so as not to avoid becoming rusty and causing electric leak. The water-proof shielding system is costly as compared with when an ordinary light equipment is employed.

To protect the light equipment against moisture, there have been made many proposals, among which is that the light equipment is provided outside the aquarium to project a light into the aquarium through a glass panel. However, the fixing of a glass panel requires an intricate handwork to produce the lids the mass production line. In addition, the light equipment is required to be coincident with the size of the glass panel, which restricts the size of light equipments. Furthermore, the known aquarium lids are not intended to hide filters, heaters and other items placed in the rear section thereof. The exposed items spoil the appearance of the aquarium.

The present invention is directed toward an aquarium lid which solves the problems pointed out with respect to the known aquarium lids discussed above. Thus an object of the present invention is to provide an aquarium lid capable of easy and economical production with permitting the use of ordinary desk lamps.

Another object of the present invention is to provide an aquarium lid which enhances the ornamental value of the aquarium.

SUMMARY OF THE INVENTION

According to the present invention, there is provided an aquarium lid has a clear plastic body, and a front wall having a feeder port closed by a pivotal cover connected to the wall, wherein the front wall has a longitudinal brim portion protruding toward the rear section of the lid so as to hide any items placed in the rear section of the lid.

Other objects and advantages of the present invention will become more apparent from the following detailed description, when taken in conjunction with the accompanying drawings which show, for the purpose of illustration only, one of illustration only, one embodiment in accordance with the present invention.

DETAILED DESCRIPTION OF THE PREFERRED EMBODIMENTS

Figure 1:
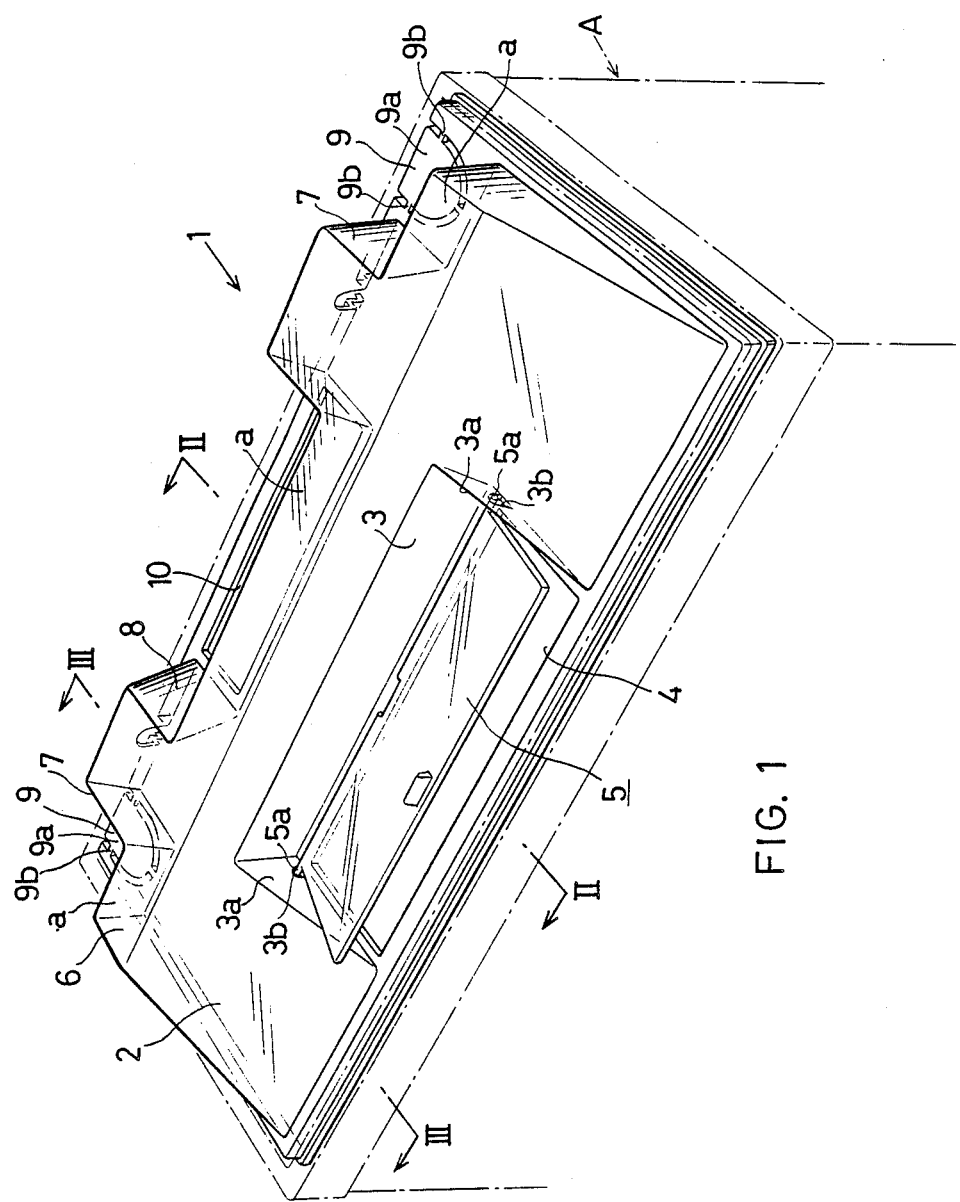
FIG. 1 is a perspective view of an aquarium lid according to the present invention.
Figure 2:
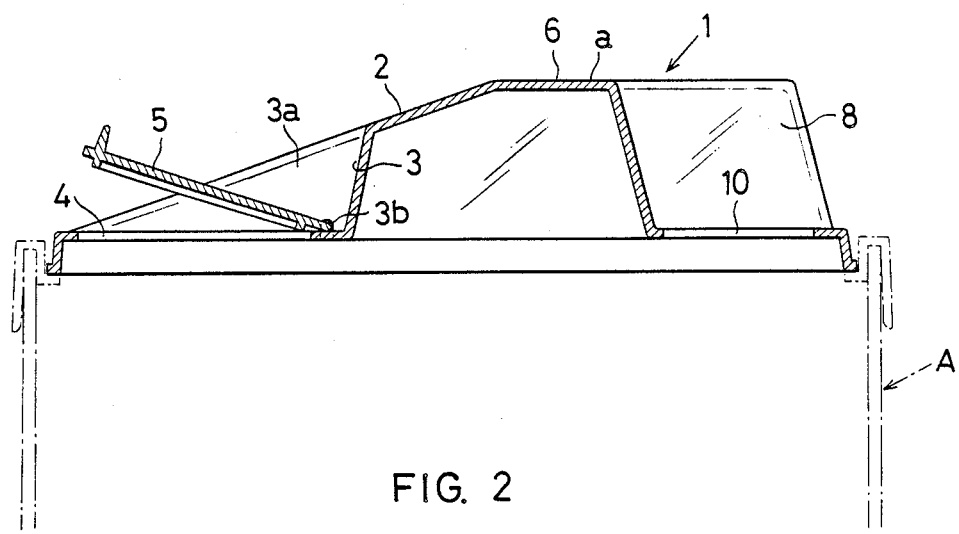
FIG. 2 is a sectional view taken along the line 2—2 of FIG. 1.
Figure 3:
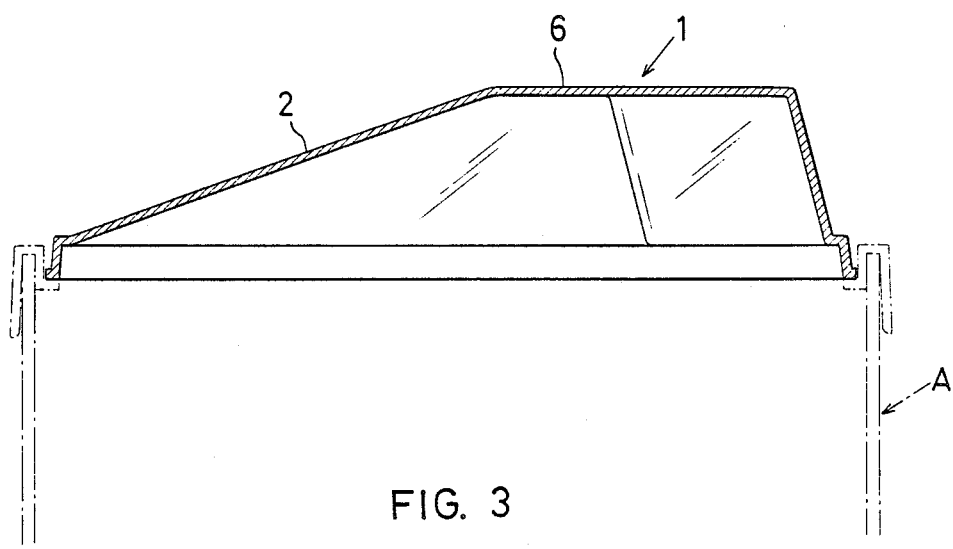
FIG. 3 is a sectional view taken along the line 3—3 of FIG. 1.

Referring to FIGS. 1 to 3, the lid 1 is formed of clear plastic such as polystyrene, acrylic resin, vinyl chloride, polyehylene, and polycarbonate. The clear plastic lid permits a light to pass therethrough into the interior of the aquarium (A). The source of light is an ordinary desk lamp (L) attached to a desk. The lid 1 includes a raised front wall 2, which is provided with a recess 3 in the center and an feeder port 4 in the recess 3 so as to permit access to the interior of the aquarium (A). The feeder port 4 is normally closed by a cover 5 which has dowels 5a projecting from opposite ends of the longitudinal side thereof received in holes 3b produced in opposite sidewalls 3a of the recess 3. The raised front wall 2 continues to a flat top wall 6 having a central recess 8 and side recesses 7. Each side recess 7 has an opening 9 for permitting easy insertion or removal of a heater and other items. The central recess 8 has an opening 10 which also permits access to the interior of the aquarium (A). Each openings 9 is closed by a removable lid 9a essentially coincident therewith, which is removed by breaking molded legs 9b integral with the periphery of the opening 9 when the aquarium is used.

Preferably, the brim portion (a) of the flat top wall 3 is higher than or flush with any filter and other items placed in the recesses 7 and 8, thereby keeping them out of sight when the aquarium is viewed from the front thereof.

Figure 4:
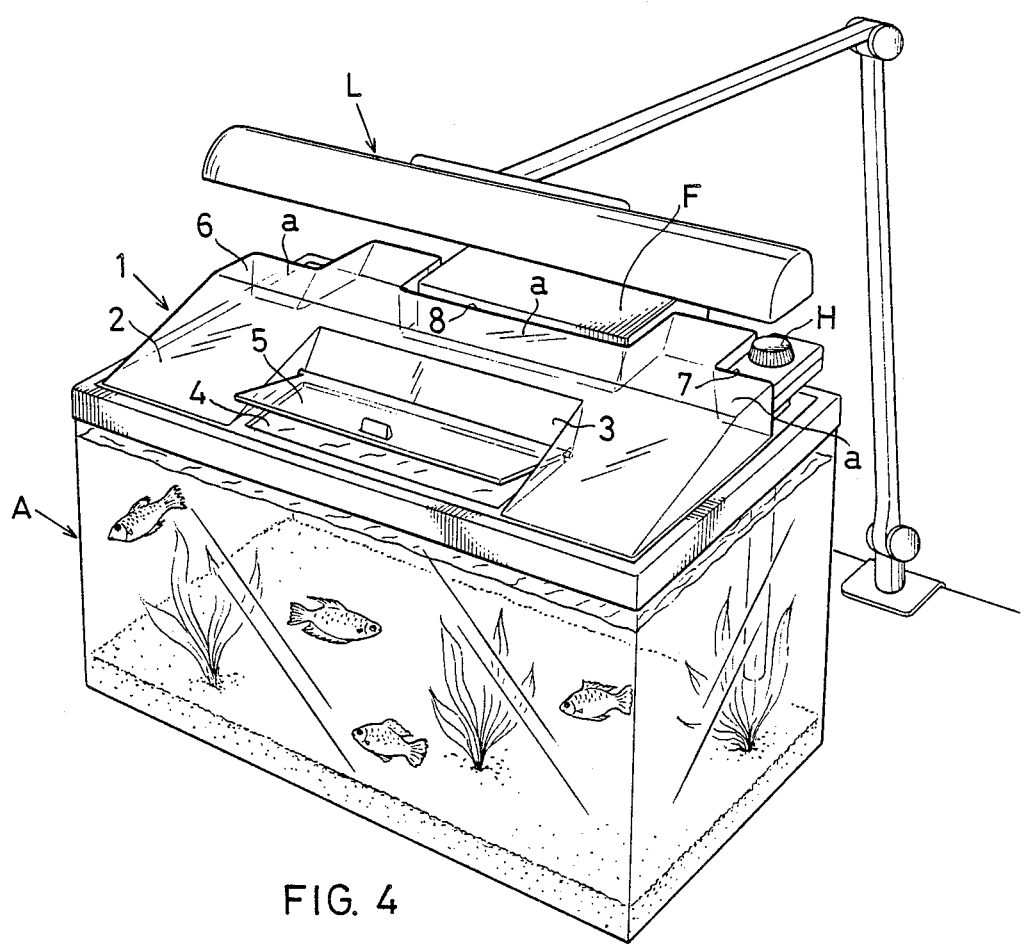
FIG. 4 is a perspective view of an aquarium incorporating one embodiment of the present invention.

In use, the lid 1 is placed on the aquarium (A) as shown in FIG. 4, with a filter (F) inserted in the opening 10, and a heater (H), a thermometer and so on being placed in the openings 9. The interior of the aquarium (A) is lit by the light equipment (L). It is not necessary to provide the lamp with any shield against moisture. It is of course possible to mount a light equipment on the aquarium (A).

Figure 5:
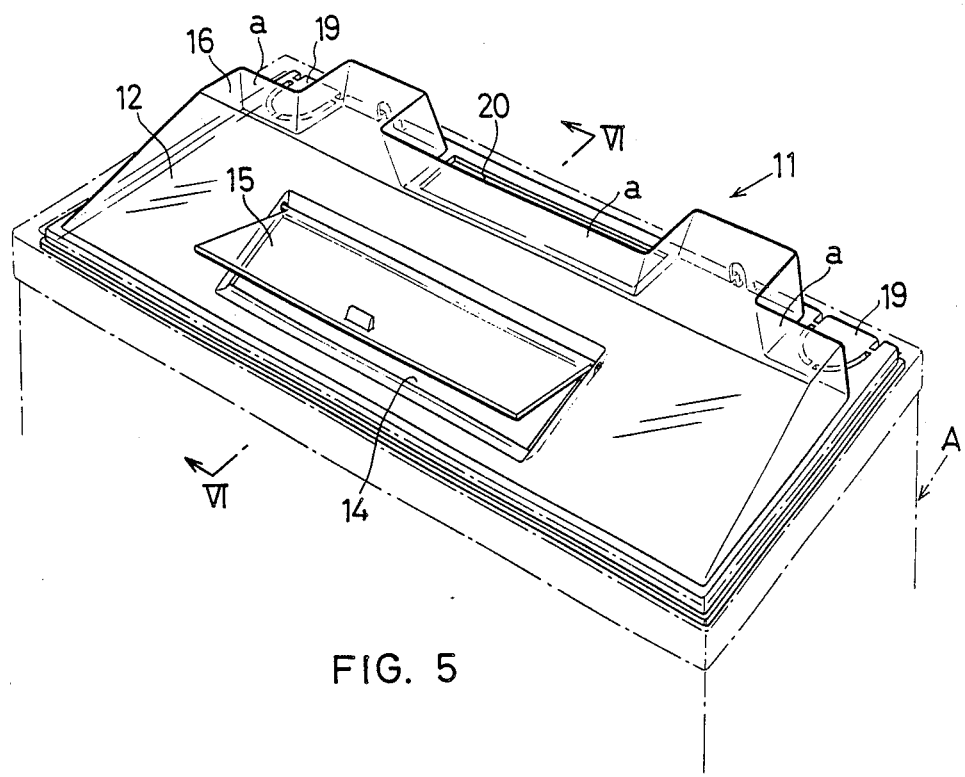
FIG. 5 is a perspective view of a modified version of the lid of FIG. 1.
Figure 6:
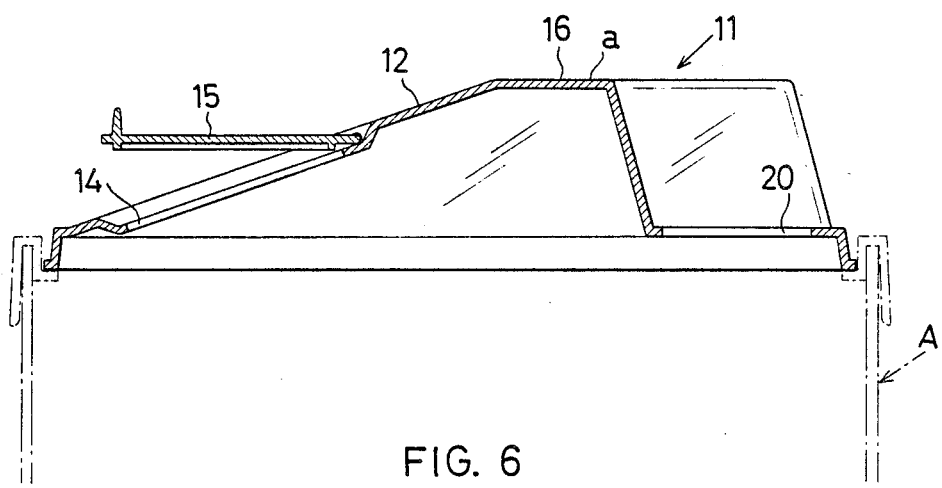
FIG. 6 is a sectional view taken along the line 6—6 of FIG. 5.

FIGS. 5 and 6 show a modified version of the embodiment in which a pivotal cover 15 is directly connected to a raised front wall 12.

Figure 7:
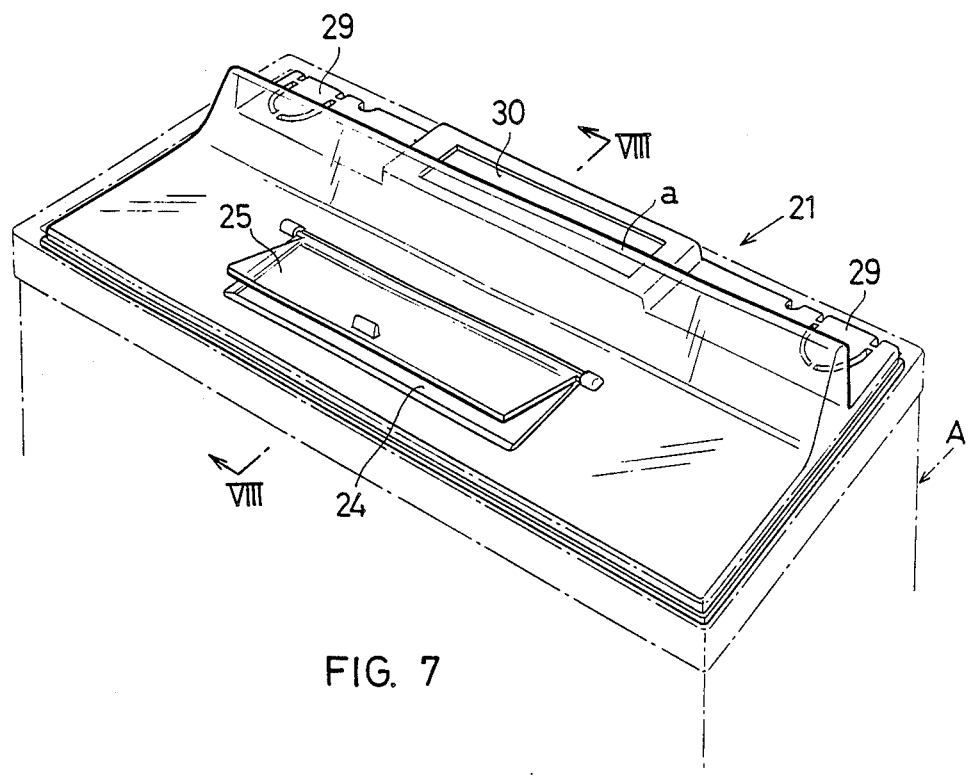
FIG. 7 is a perspective view of another modified version of the lid of FIG. 1.
Figure 8:
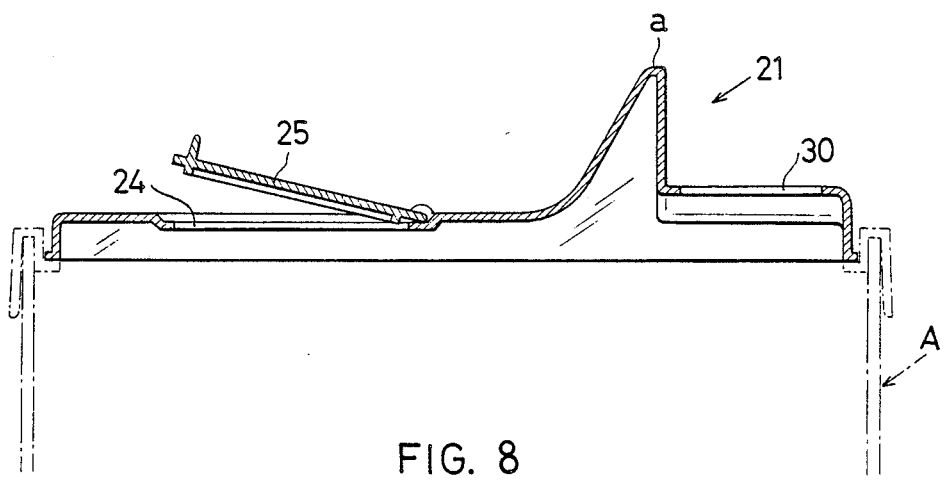
FIG. 8 is a sectional view taken along the line 8—8 of FIG. 7.

FIGS. 7 and 8 show another modified version, characterized in that the lid 21 has a flat front wall having a longitudinal brim portion (a) protruding upwards. A feeder port 24 is closed by a cover 25 pivotally connected to the flat front wall. The protruding brim portion (a) is to hide any filter and heater placed in the openings 30.

From the above description, it will be apparent that the aquarium lid of the present invention is advantageous. First, it can be mass-produced economically. Second, the clear plastic lid permits light permeability therethrough to light the interior of the aquarium. Third, it is not necessary to shield the light equipment against moisture, thereby permitting the use of an ordinary desk lamp placed beside the aquarium. This reduces the production cost. Fourth, a filter, a heater and other items placed in the rear section of the lid are kept out of sight, thereby maintaining the ornamental value as an household aquarium.

What is claimed is:

1. A lid for covering an aquarium for household use, said lid comprising a clear plastic body through which light readily passes into the interior of the aquarium, said plastic body having a front wall with a feeder port closed by a pivotal cover connected thereto, said front wall having a rising portion and a flat top portion with three recesses opening into the interior of the aquarium and adapted to accept aquarium accessories, said flat top portion having a longitudinal, protruding brim portion toward the rear section of the lid, said protruding brim being sufficiently high to be at least flush with the top surface of any aquarium accessory associated with said recesses opening into the interior of the aquarium.

* * * * *